United States Patent
Fukuda et al.

(10) Patent No.: US 6,400,451 B1
(45) Date of Patent: Jun. 4, 2002

(54) NON-CONTACT WHEEL ALIGNMENT MEASURING METHOD AND SYSTEM

(75) Inventors: Yutaka Fukuda, Tokorozawa; Kenji Funakoshi, Tokyo, both of (JP)

(73) Assignee: Anzen Motor Car Co., Ltd. (JP)

( * ) Notice: Subject to any disclaimer, the term of this patent is extended or adjusted under 35 U.S.C. 154(b) by 0 days.

(21) Appl. No.: 09/501,859

(22) Filed: Feb. 10, 2000

(30) Foreign Application Priority Data

Feb. 10, 1999 (JP) .......................................... 11-033016

(51) Int. Cl.$^7$ .......................... G01B 11/26; G01B 5/24; G01C 3/08
(52) U.S. Cl. .............................. 356/139.09; 33/203.18; 33/203.19; 33/288; 356/4.03
(58) Field of Search .......................... 356/139.09, 4.03; 33/288, 203.18, 203.19

(56) References Cited

U.S. PATENT DOCUMENTS

| | | |
|---|---|---|
| 4,745,469 A | 5/1988 | Waldecker et al. .......... 358/93 |
| 5,519,489 A * | 5/1996 | McClenahan et al. . 356/139.09 |
| 5,600,435 A * | 2/1997 | Bartko et al. .......... 356/139.09 |
| 5,978,077 A * | 11/1999 | Koerner et al. ........ 356/139.09 |

OTHER PUBLICATIONS

Patent Abstracts of Japan, 09–280843, Oct. 31, 1997; http://www1.ipdl.jpo.go.jp/PA1/result/detail/main/wAAAa28044DA409280843P1.htm.

* cited by examiner

Primary Examiner—Stephen C. Buczinski
(74) Attorney, Agent, or Firm—Skjerven Morrill MacPherson LLP

(57) ABSTRACT

A non-contact type wheel alignment measuring apparatus includes a fixed-focal-length lens and a pair of light sources located on the opposite sides of the lens for projecting a pair of laser beams onto the side surface of a wheel to be measured. The apparatus also includes a CCD sensor on which images reflecting from the wheel are formed and the distance between the two images is detected as a function of pixels of CCD sensor between them. The information of this distance (or the number of pixels) is utilized to determine the distance between the measuring apparatus and a point of interest on the wheel. With two or more such information for different locations on the wheel, its alignment characteristic, such as toe-in and camber angles, can be determined.

16 Claims, 4 Drawing Sheets

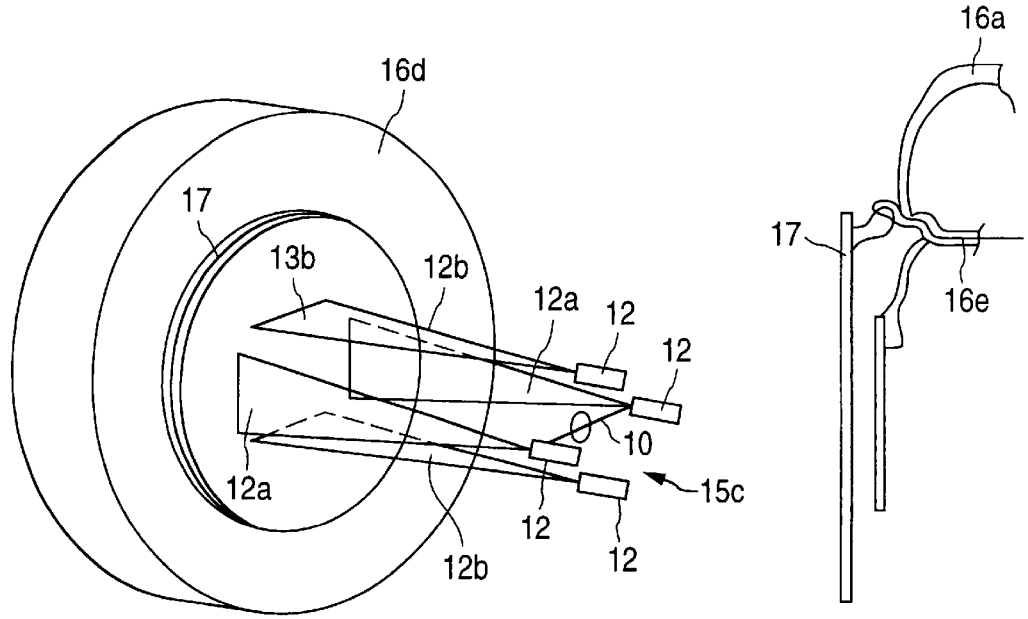
FIG. 5A  FIG. 5B
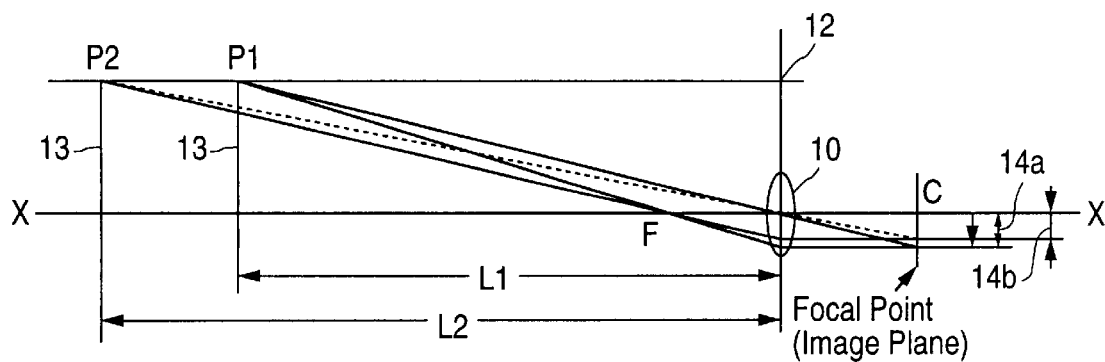
FIG. 6

NON-CONTACT WHEEL ALIGNMENT MEASURING METHOD AND SYSTEM

BACKGROUND OF THE INVENTION

1. Field of the Invention

This invention generally relates to a wheel alignment measuring method and system, and, in particular, to a method and system for measuring wheel alignment characteristics of a wheel of a vehicle such as an automobile.

2. Description of the Prior Art

A wheel of a vehicle, such as an automobile, is set with various alignments, such as toe-in and camber angles, and it is important to measure such alignments with high accuracy. In measuring such alignment characteristics of a wheel of a vehicle, there are basically two categories of measuring technologies, i.e., the contact type measuring technology and the non-contact type measuring technology.

In the contact type measuring technology, a measuring apparatus is brought into direct contact with a wheel to be measured for measuring toe-in and camber angles. The contact type measuring apparatus tends to be inexpensive, but its measuring accuracy is limited and difficulty is often encountered in taking measurements for various reasons.

On the other hand, in the case of the non-contact type measuring technology, it is typically based on the triangulation and a rather complicated calculation is required in processing an image of a wheel obtained by a CCD imaging device. An example the non-contact type wheel alignment measuring technology was proposed by one of the present inventors and described in the Japanese Pat. Laid-open Pub. No. 9-280843, assigned to the assignee of this application. As a result, the structure of the non-contact type measuring apparatus tends to be complicated in structure and thus difficulty is encountered in manufacturing the apparatus. Thus, the non-contact type measuring apparatus tends to be expensive.

SUMMARY OF THE INVENTION

In accordance with one aspect of the present invention, there is provided a method for measuring an alignment characteristic of a vehicle, comprising:

(a) projecting a first pair of light beams, which are in parallel to each other and separated by a predetermined distance, to a first area of a side wall of a tire of said wheel or to a flat surface detachably attached to said wheel;

(b) receiving reflected light from said first projected pair of light beams incident on said side wall or said flat surface and forming images from said reflected light at an image-forming surface of a first photo-electric converting device at a first location, said first photo-electric converting device being at a fixed distance from said wheel in an approximately axial direction;

(c) measuring a length of a first space between said images formed on said first photo-electric converting device;

(d) calculating a first distance to a first point on said side wall or said flat surface between the points of incidence of said first pair of light beams on said side wall or to said flat detector plate from said first photo-electric converting device, using said length of said first space;

(a2) projecting a second pair of light beams, which are in parallel to each other and separated by a predetermined distance, to a second area of said side wall of a tire of said wheel or to said flat surface detachably attached to said wheel;

(b2) receiving reflected light from said second projected pair of light beams incident on said side wall or said flat surface and forming images from said reflected light at an image-forming surface of a second photo-electric converting device at a second location, said second imaging device being at a fixed distance from said wheel in an approximately axial direction;

(c2) measuring a length of a second space between said images formed on said second photo-electric converting device;

(d2) calculating a second distance to a second point on said side wall or said flat surface between the points of incidence of said second pair of light beams on said side wall or said flat surface from said second photo-electric converting device, using said length of said second space; and (e) calculating an angle of said wheel from said first and said second distances and said first and second locations of said first and said second photo-electric converting devices.

Preferably, the alignment characteristic is selected from the group essentially consisting of a toe-in angle and a camber angle. When the toe-in angle is selected as an alignment characteristic to be measured, the at least two different measuring locations include at least two locations which are set substantially along a horizontal line on the outer side surface of the tire, which horizontal line is defined by a horizontal plane extending along the axis of rotation of the wheel. Alternatively, when the camber angle is to be measured, the at least two different measuring locations include at least two locations which are set substantially along a horizontal line on the outer side surface of the tire, which horizontal line is defined by a horizontal plane extending along the axis of rotation of the wheel, and also at least one location which is set substantially along a vertical line on the outer side surface of the tire, which vertical line is defined by a vertical plane extending along the axis of rotation of the wheel.

Preferably, the step (e) is carried out at the same time for each of the at least two different locations.

In accordance with another aspect of the present invention, there is provided an apparatus for measuring a distance to a surface, the apparatus comprising:

projecting means for projecting a pair of light beams in parallel to each other, while keeping a separation therebetween at a constant, toward said surface;

a photo-electric converting device having an image forming surface, said photo-electric converting device being capable of converting one or more images formed on said image forming surface into an electrical signal indicating the locations of said one or more images on said image-forming surface relative to a reference location on said image forming surface;

image forming means for receiving light from said projected pair of light beams reflected from said surface and forming a pair of images on said image forming surface; and processing means for processing said electrical signal produced by said photo-electric converting device responsive to said pair of images formed by said image forming means, and capable of measuring an image separation between said images, and to calculate a distance to a portion of said surface between said pair of projected light beams from a predetermined reference point from said image separation.

Preferably, the image forming means includes an optical lens and the predetermined reference point for measurement is set at the center of the optical lens. The optical lens preferably has a fixed focal distance. The photo-electric converting device preferably includes a CCD image sensor having a predetermined number of pixels along a line defined on the image-forming surface having the predetermined reference location at its end.

Preferably, the processing means includes a central processing unit (CPU) for implementing a calculation according to the predetermined formula to determine a distance to a point of interest (measurement point) on the wheel. The processing means also includes means for determining a toe-in angle according to another formula based on at least two distance measurements obtained for at least two different locations of a wheel and also for determining a camber angle according to a further formula based on at least three distance measurements obtained for at least three different locations of a wheel.

In accordance with a further aspect of the invention, there is provided an apparatus for measuring alignment of a wheel of a vehicle, comprising:

a plurality of measurement apparatuses, each of said measuring apparatuses including:
projecting means for projecting a pair of light beams, in parallel to each other while keeping a separation therebetween at constant, toward a side wall of a tire of said wheel or a flat surface detachably attached to said wheel;
a photo-electric converting device having an image forming surface, said photo-electric converting device being capable of converting one or more images formed on said image forming surface into an electrical signal, said signal indicating the locations of said one or more images on said image-forming surface relative to a reference location on said image forming surface;
image forming means for receiving light from said projected pair of light beams reflecting from said side wall or from said flat detector surface, thereby to form a pair of images of said pair of light beams on said image forming surface; and
a reference to said reference location on said image forming surface;
wherein each measuring apparatus has been calibrated to produce a set of calibration data, and
a structure, for positioning each of said plurality of apparatuses in a reference plane at a plurality of locations, each location being at roughly the same radial distance from the axis of rotation of said wheel, and said beams being projected roughly parallel to said axis of rotation; and
processing means for:
processing said electrical signals produced by each of said photo-electric converting devices of each of said plurality of apparatuses;
calculating each of a plurality of distances to a plurality of portions of said side wall or said surface from said references of said plurality of apparatuses from said electrical signals and said set of calibration data; and
calculating at least one alignment angle of said wheel from said plurality of distances so calculated.

Preferably, the first measuring apparatus includes a first pair of light sources for producing the pair of light beams, which are located on the opposite sides of the associated photo-electric converting device while lying in the same horizontal plane. The first pair of light sources preferably projects its pair of light beams toward a top portion of a side wall of a tire of a wheel to be measured or of the flat detector surface of a detector disc detachably attached to the wheel. Also preferably, the second measuring apparatus includes two second pairs of light sources each for producing the pair of light beams, the light sources of each of the second pairs which being located on top and bottom of the associated photo-electric converting device while lying in the same vertical plane. Each of the second pairs of light sources preferably projects its pair of light beams to a location of a side wall of a tire of a wheel to be measured in the vicinity of a horizontal plane extending along the center of rotation of the wheel or of the flat detector surface of a detector disc detachably attached to the wheel.

Preferably, the system further comprises positioning means for positioning each of the first and second measuring apparatuses relative to a wheel to be measured. Preferably, the positioning means includes first positioning means for positioning the first measuring apparatus relative to a wheel to be measured and second positioning means for positioning each of the second measuring apparatuses relative to a wheel to be measured. Preferably, the first positioning means has a function for moving the first measuring apparatus along a vertical direction and setting the first measuring apparatus at a desired height. In addition, the second positioning means has a function for moving each of the second measuring apparatuses along a predetermined slope and setting it at a desired height and horizontal location. These first and second positioning means can be implemented by any positioning mechanisms, such as elevators, which are well known to those skilled in the art.

It is therefore a primary object of the present invention to provide an improved wheel alignment measuring method and apparatus simple in structure and low at manufacturing cost.

Another object of the present invention is to provide a wheel alignment measuring method and apparatus easy, fact and accurate in operation.

A further object of the present invention is to provide an improved non-contact type wheel alignment measuring system compact in structure and easy to manufacture.

Other objects, advantages and novel features of the present invention will become apparent from the following detailed description of the invention when considered in conjunction with the accompanying drawings.

BRIEF DESCRIPTION OF THE DRAWINGS

FIGS. 5(A) and 5(B) are schematic illustrations showing a wheel alignment measuring system constructed in accordance with another embodiment of the present invention; and FIG. 6 is an illustration which is also useful for explaining the principle of calculation used for determining a distance to a location of interest from a reference point.

DESCRIPTION OF THE PREFERRED EMBODIMENTS

Figure 1A:
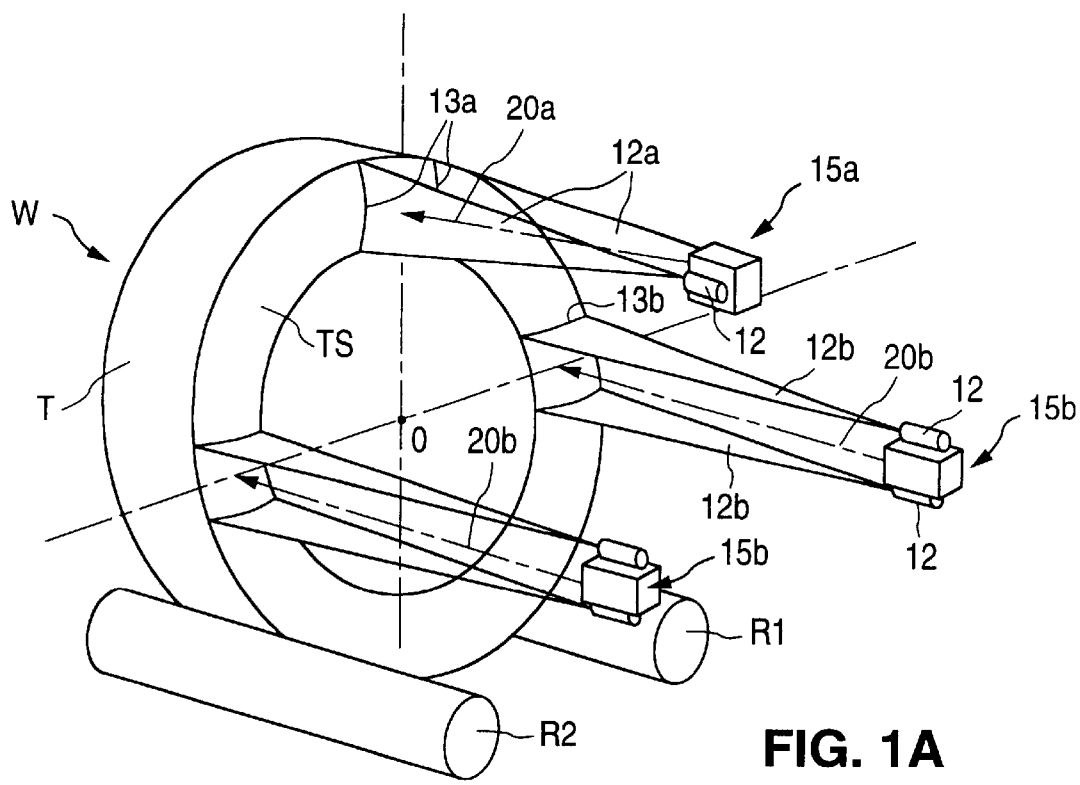
FIG. 1(A) is a schematic illustration showing in perspective view a wheel alignment measuring apparatus constructed in accordance with one embodiment of the present invention.

Referring now to FIG. 1(A), there is schematically shown a wheel alignment measuring system constructed in accordance with one embodiment of the present invention.

As shown, the present system includes a vertical wheel alignment measuring apparatus 15a and a pair of horizontal wheel alignment measuring apparatuses 15b. As will become clear later, the vertical measuring apparatus 15a is substantially the same in structure as a horizontal measuring apparatus 15b, excepting the arrangement of its associated pair of light sources.

Although it is not shown in FIG. 1(A) for the sake of clarity, it is to be noted that the present system includes a positioning mechanism for positioning these vertical and horizontal measuring apparatuses 15a and 15b, relative to a wheel W to be measured. As will become clear later, the positioning mechanism should be able to move and temporarily set the vertical measuring apparatus 15a in a vertical direction and also to move and temporarily set the horizontal measuring apparatus 15b along a slope extending substantially in parallel with the wheel W to be measured. The positioning mechanism is preferably movable to be brought closer to or separated away from the wheel W to set a separation distance between the measuring apparatuses 15a and 15b and the wheel W at a desired value while keeping a parallel relationship therebetween.

In the example shown in FIG. 1(A), the wheel W to be measured is supported on a pair of rollers R1 and R2, one of which is preferably driven to rotate by means of a motor which is not shown, in which case measurements can be carried out while keeping the wheel W in rotation, thereby allowing dynamic measurements. Alternatively, the rollers R1 and R2 can be set stationary, if desired, in which case the wheel W is supported on the rollers R1 and R2 without rotation, thereby allowing static measurements. The present invention can be implemented in either mode, static or dynamic.

Figure 1B:
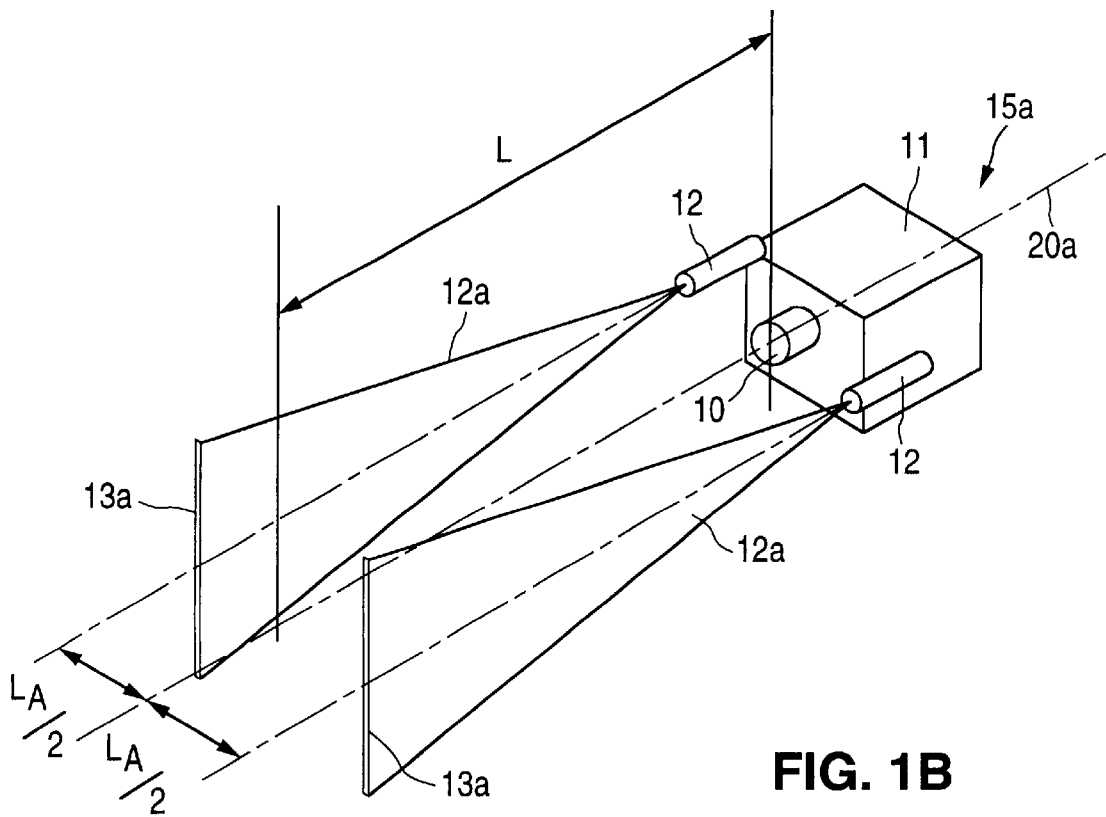
FIG. 1(B) is a schematic illustration showing in perspective view a wheel alignment measuring apparatus constructed in accordance with an embodiment of the present invention and constituting part of the system shown in FIG. 1(A)

FIG. 1(B) illustrates more in detail the structure of the vertical measuring apparatus 15a employed in the present measuring system of FIG. 1. That is, as shown in FIG. 1(B), the vertical measuring apparatus 15a includes an optical lens 10 having a fixed focal length which defines an optical axis 20a of the vertical measuring apparatus 15a. The lens 10 functions as an image forming unit and it is mounted on a camera body 11, which also houses there in an photo-electric converter, such as a CCD device. In addition, a pair of light sources 12, 12 is fixedly mounted on the opposite side surfaces of the camera body 11. Each of the light sources 12, 12 projects a laser beam 12a, which is in parallel with the optical axis 20a and separated away from the optical axis 20a at a fixed distance of LA/2. Thus, the pair of laser beams 12a, 12a emitted from the pair of light sources 12, 12 advance in parallel to each other while keeping a separation distance therebetween at constant, i.e., at LA. The laser beam 12a emitted from the associated light source 12 is preferably a line beam, or alternatively, a vertically radiating laser beam, which defines a vertically extending line beam. In the example shown in FIG. 1(B), the laser beam emitted from the associated light source 12 radiates in the vertical direction so that a vertical line image 13a is formed on a projected plane.

Referring back to FIG. 1(A), since a pair of vertically radiating laser beams 12a, 12a is projected from the pair of associated light sources 12, 12 to a side wall TS of a tire T, there is formed a pair of projected line images 13a, 13a on the side wall TS. Since the projected laser beams 12a, 12a are in parallel and separated at constant, i.e., LA in this example, the resulting line images 13a, 13a are in parallel and separated at distance LA. In the example shown in FIG. 1(A), the vertical measuring apparatus 15a is positioned such that its optical axis 20a passes substantially through a hypothetical vertical line passing through the center of rotation of wheel W near the top of the bulge of the side wall TS. Thus, the pair of line images 13a, 13a are formed on both sides of the hypothetical vertical line passing through the center of rotation of wheel W. It is to be noted that each of the resulting line images 13a, 13a defines a reflecting light source as will be described later. The vertical measuring apparatus 15a is so called because it projects vertical line images 13a on the side wall TS.

Also as shown in FIG. 1(A), each of the pair of horizontal measuring apparatuses 15b includes elements similar to those of the vertical measuring apparatus 15a as described above excepting the fact that the pair of light sources 12, 12 is mounted on top and bottom of the camera body 11 and each of the light sources 12, 12 projects a laser beam which forms a line image 13b when projected onto the side wall TS in the case of the horizontal measuring apparatus 15b. In the system shown in FIG. 1(A), each of the horizontal measuring apparatuses 15b, 15b is so positioned that its associated optical axis 20b passes through a hypothetical horizontal line passing through the center of rotation of wheel W at a location or substantially close to the top of the bulge of tire T. Thus, the pair of line images 13b, 13b are formed above and below the hypothetical horizontal line as extending horizontally and spaced apart from each other at distance LA. The horizontal measuring apparatus 15b is so called because it projects horizontal line images 13b on the side wall TS.

In accordance with the principle of the present invention, he separation distance between the pair of projected laser beams is maintained at constant, i.e., separation distance LA in the illustrated example. Then, the projected images 13a, 13b can now serve as reflecting light sources so that the reflecting light beams from such reflecting light sources 13a, 13b will form images on an image plane, e.g., CCD, inside the camera body 11 after passing through the lens 10 and the distance between these images formed on the image plane will change depending on the distance between the wheel W and the measuring apparatus 15a, 15b. Thus, if we determine the distance between the images formed on the image plane, then we should be able to determine the distance to a point of interest on wheel W from the measuring location, such as lens 10. This can be understood better once explained while referring to FIG. 6.

That is, as shown in FIG. 6, there is provided a fixed-focal-length lens 10 having an optical axis X. An image plane is defined at a focal distance C of lens 10. Thus, a line image 13 having height P1 and positioned at location L1 from original point 12 of lens 10 will form an image having height 14a on the image plane C. On the other hand, if the same image 13 having height P2 which is equal to P1 is located at distance L2, there is formed an image having height 14b on the image plane. Although the image heights 14a and 14b are shown away from the image plane C for the sake of convenience, it should be noted that the images are formed on the image plane at focal distance C of lens 10. Thus, as the light source image 13 having the fixed height moves away from the lens 10 (i.e., from L1 to L2), the image formed on the image plane C becomes shorter, whereas as the light source 13 moves closer to the lens 10 (i.e., from L2 to L1), the image formed on the image plane C becomes taller. Accordingly, if we can determine the height of the image formed on the image plane C, then we should be able to determine the distance between the light source image 13 and the lens 10. This principle is utilized in determination or calculation of distance between a point of interest on a wheel and a reference location in the present invention.

Figure 2:
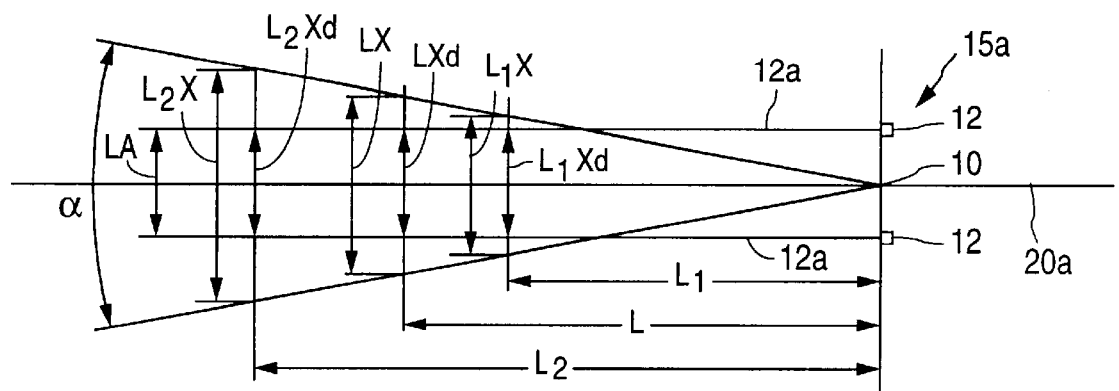
FIG. 2 is an illustration which is useful in explaining the principle of calculation for determining a distance from a reference point for measurement to a location of interest on a wheel to be measured.

Referring now to FIG. 2, the principle of present invention in determining a point of interest on a wheel and a reference location will be described. As shown, the fixed-focal-distance lens 10 defines its optical axis 20a and its associated pair of light sources 12 is disposed on the opposite sides of the lens 10 each separated away from the optical axis at distance LA/2. The lens 10 has field angle, or angle of view, gamma, i.e., gamma which expands as separated away from the lens 10. Now, length Lx subtended by field view gamma at distance L from lens 10 corresponds to the maximum number of pixels of the image-forming surface of the CCD in the camera body 11. Similarly, lengths $L_1X$ and $L_2X$ subtended by field view gamma at distances $L_1$ and $L_2$, respectively, from lens 10 also correspond to the maximum number of pixels of the image-forming surface of the CCD sensor. changes, the number of pixels for length Lx remains at constant, i.e., at its maximum value, since the length Lx is the length subtended by the angle of view of lens 10. On the other hand, since the distance between the pair of reflecting light sources 13a or 13b remain at constant, i.e., at LA, the number of pixels Lxd covered by a distance between the images formed on the CCD sensor should reduce. Thus, the number of pixels covered by a distance between the pair of images formed on the CCD sensor for distance L1 is $L_1$xd, whereas the number of pixels for distance L2 is $L_2$xd. Although all of Lxd, $L_1$xd and $L_2$xd look the same in length in FIG. 2, since they represent the number of pixels covered by a distance between the pair of images formed on the image plane of CCD sensor, $L_1$xd has more pixels as compared with $L_2$xd since the ratio between $L_1$xd and $L_1$x is larger than the ratio between $L_2$xd and $L_2$x. That is, since $L_1$xd/$L_1$x is larger, it implies that the distance between the pair of images formed on the image plane of CCD sensor includes a larger number of pixels and thus the distance between the pair of images formed on the image plane is larger than that for distance L2.

In order to use the present invention, it is necessary to carry out calibration to determine certain parameters. That is, when shipping or checking a measuring apparatus or system embodying the present invention, the following calibration procedure should be carried out.

Calibration Procedure (a) A calibration object is set at a location where measurements are to be taken.

(b) The calibration object is set at distance L1 from the measuring apparatus and the number of pixels ($L_1$xd) of CCD covered by a distance between the two images formed on the image plane of CCD is stored.

(c) The calibration object is set at distance L2 from the measuring apparatus and the number of pixels ($L_2$xd) of CCD covered by a distance between the two images formed on the image plane of CCD is stored.

(d) From the values obtained in (b) and (c) above, the values of respective lengths $L_1$x and $L_2$x subtended by field angle gamma and also calibration coefficient K (tangent of half of field angle gamma are calculated and then stored.

Now, in operation, according to the principle of the present invention, the distance L of a point of interest on an object to be measured, such as wheel W, from lens 10 is determined as set forth below.

That is, assuming that the maximum number of pixels (dots) on the image plane of CCD is 512, since the distance between the pair of projected line images on wheel W is fixed at LA (mm), the length $L_1$x at distance L1 subtended by field angle gamma, which corresponds to the distance between the pair of images formed on the image plane of CCD, can be determined by the equation of 512×(LA/$L_1$xd). Similarly, the length L2x at distance L2 subtended by field angle gamma can be determined by the equation of 512× (LA/$L_2$xd). Now, by definition, K=(L2x−$L_1$x)/2/((L2−L1)= tan(gamma/2). Since the length Lx at distance L subtended by field angle gamma is 512×(LA/Lxd), L−L1=(Lx−L1x)/ 2/K. Accordingly, the distance L from the lens 10 can be determined by the following formula.

$$L1+(512\times LA/Lxd-L_1x)/2/K$$

Figure 3A:
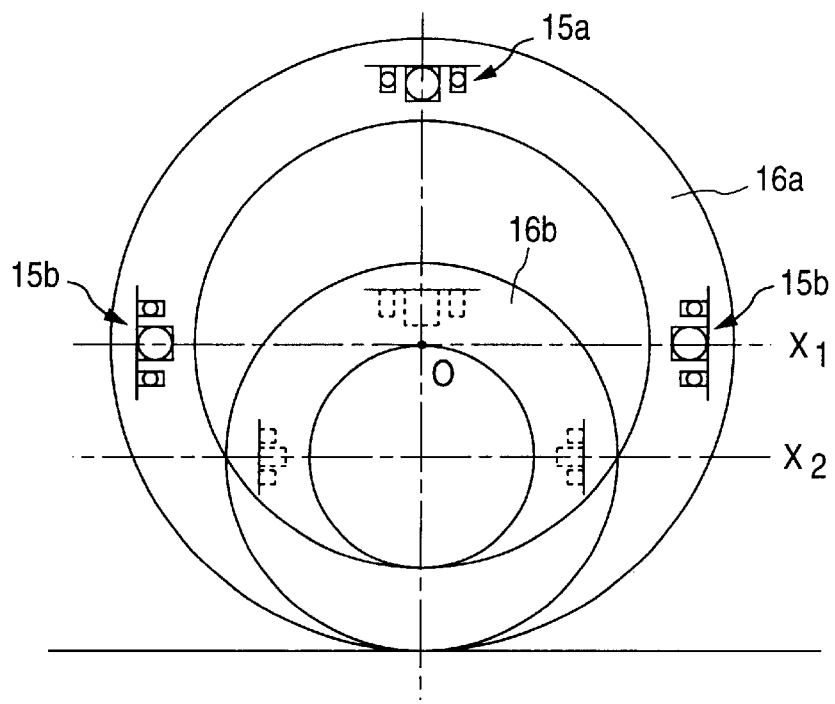
FIGS. 3(A) and 3(B) are illustrations showing how the present invention may be advantageously used for carrying out alignment measurements for wheels different in size.
Figure 3B:
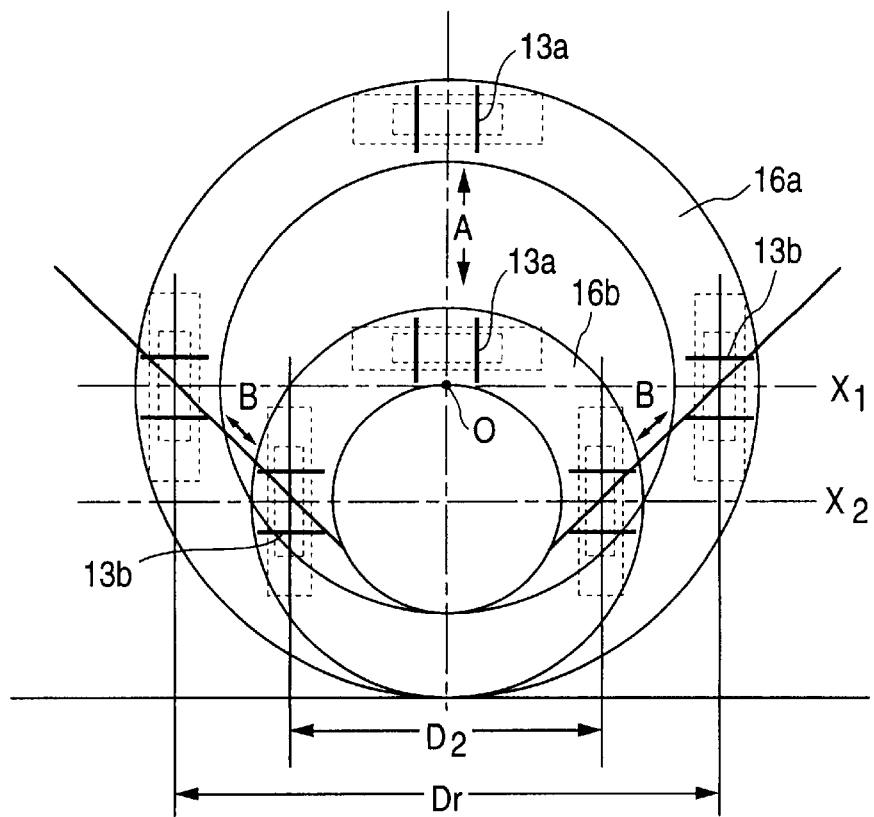

Referring now to FIGS. 3(A) and 3(B), a description will be had regarding how the present measuring system shown in FIG. 1(A) can be used for wheels of different sizes. FIG. 3(A) illustrates the positional relationship between a wheel to be measured and the measuring units 15a and 15b of the present wheel alignment measuring system. As described before, assuming that the wheel to be measured has a tire 16a, the vertical measuring unit 15a has its optical axis substantially aligned to the hypothetical vertical axis passing through the center 0 of rotation of the wheel, and each of the horizontal measuring units 15b, 15b has its optical axis substantially aligned to the hypothetical horizontal axis passing through the center of rotation of the wheel. Now, if the wheel to be measured has been changed to a smaller sized wheel and it has a tire 16b as shown in FIG. 3(A), then the hypothetical horizontal axis X2 becomes lower than the previous hypothetical horizontal axis X1.

Accordingly, as shown in FIG. 3(B), for carrying out wheel alignment measurements for the smaller-sized wheel, the vertical measuring unit 13a must be moved straight down as indicated by arrow A, whereas the horizontal measuring units 13b, 13b must be moved along a slope as indicated by arrow B. The arrows A and B are double-sided since the measuring units 15a and 15b must be moved to accommodate the size of a wheel to be measured in either direction depending on the size. The present measuring system includes a positioning mechanism for taking care of this positioning of the measuring units 15a and 15b depending on the size of a wheel to be measured. The positioning mechanism, for example, may include an elevator unit for positioning the vertical measuring unit 15a and also a combination of an elevator and a horizontally movable slider for positioning the horizontal measuring unit 15b. Such an elevator and a slider can be any well-known unit and a person skilled in the art would find no difficulty in building such a positioning mechanism to be used in the present invention, though not shown specifically.

Figure 4A:
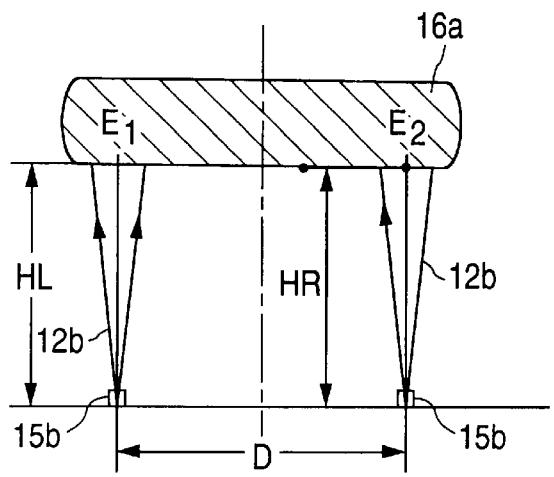
FIGS. 4(A) and 4(B) are illustrations showing how toe-in and camber angles of a wheel can be measured according to the present invention, respectively.

Now, FIG. 4(A) illustrates the case in which the toe-in angle of a wheel is determined according to the present invention. As shown, the distances HL and HR between respective points El and E2 of interest on wheel 16a and the respective horizontal measuring units 15b, 15b (more specifically, their lenses 10) can be determined according to the present measuring system. In addition, since the distance D between the pair of horizontal measuring units 15b and 15b is known, the toe-in angle alpha of wheel 16a can be determined by the following formula.

$$alpha = \arctan(HL-HR)/D$$

Figure 4B:
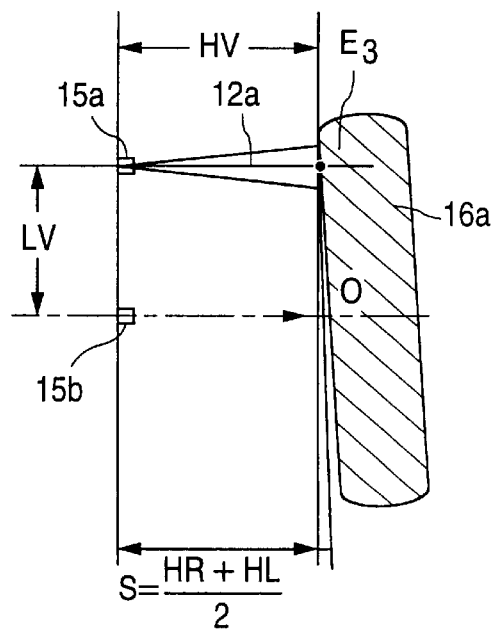

On the other hand, FIG. 4(B) illustrates the case for determining the camber angle of wheel 16a. That is, as shown in FIG. 4(B), the distance HV between a point E3 of interest on wheel 16a and the vertical measuring apparatus 15a can be determined according to the present invention as set forth above. Then, using the values HR and HL obtained from the horizontal measuring apparatuses 15b, 15b as described above and also the height LV between the vertical measuring apparatus 15a and the axis passing through the center of rotation of wheel 16a, or the height of horizontal measuring apparatus 15b, which is known, the distance between the center between the pair of horizontal measuring apparatuses 15b and 15b and the center O of rotation of wheel 10 16a on an outer side surface thereof is determined as S=(HR+HL)/2 and thus the camber angle beta of wheel 16a can be determined by the following formula.

$$beta = \arctan[(S-HV)/LV]$$

FIGS. 5(A) and (B) show a wheel alignment measuring system constructed in accordance with another embodiment of the present invention. In this embodiment, use is made of a detector disc 17 having an outer flat detector surface, which disc 17 is temporarily attached to a rim 16e of wheel 16d. The disc 17 is attached such that its flat detector surface is normal to the axis of rotation of wheel 16d. In addition, the measuring system of this embodiment comprises a central measuring apparatus 15c which includes a fixed-focal-length lens 10 which is mounted on a camera box, which is not shown, which, in turn, houses therein a CCD sensor, which is also not shown. Four light sources 12 are mounted on the top, right, left and bottom sides of the camera box. In the illustrated example, the top and bottom light sources 12 provide a pair of horizontally radiating laser beams 13b, 13b spaced apart at a predetermined distance and projected in parallel to each other, whereas the both of the side light sources 12 provide vertically radiating laser beams 12a, 12a, spaced apart at a predetermined distance and projected in parallel to each other.

While the above provides a full and complete disclosure of the preferred embodiments of the present invention, various modifications, alternate constructions and equivalents may be employed without departing from the true spirit and scope of the invention. For example, a wheel alignment measuring system embodying the present invention may include a desired number of horizontal and/or vertical measuring units. If the system includes only a single measuring unit, then it may be moved horizontally and/or vertically to take measurements in sequence for different locations of a wheel to be measured and it may e rotated around its optical axis to provide either the vertically radiating or horizontally radiating beam as desired. Therefore, the above description and illustration should not be construed as limiting the scope of the invention, which is defined by the appended claims.

What is claimed is:

1. A method for measuring alignment of a wheel of a vehicle, comprising:
   (a) projecting a first pair of light beams, which are in parallel to each other and separated by a predetermined distance, to a first area of side wall of a tire of said wheel or to flat surface detachably attached to said wheel;
   (b) receiving reflected light from said first projected pair of light beams incident on said side wall or said flat surface and forming images from said reflected light at an image-forming surface of a first photo-electric converting device at a first location, said first photo-electric converting device being at a fixed distance from said wheel in an approximately axial direction;
   (c) measuring a length of a first space between said images formed on said first photo-electric converting device;
   (d) calculating a first distance to a first point on said side wall or said flat surface between the points of incidence of said first pair of light beams on said side wall or to said flat detector plate from said first photo-electric converting device, using said length of said first space;
       (a2) projecting a second pair of light beams, which are in parallel to each other and separated by a predetermined distance, to a second area of said side wall of a tire of said wheel or to said flat surface detachably attached to said wheel;
       (b2) receiving reflected light from said second projected pair of light beams incident on said side wall or said flat surface and forming images from said reflected light at an image-forming surface of a second photo-electric converting device at a second location, said second imaging device being at a fixed distance from said wheel in an approximately axial direction;
       (c2) measuring a length of a second space between said images formed on said second photo-electric converting device;
       (d2) calculating a second distance to a second point on said side wall or said flat surface between the points of incidence of said second pair of light beams on said side wall or said flat surface from said second photo-electric converting device, using said length of said second space; and
   (e) calculating an angle of said wheel from said first and said second distances and said first and second locations of said first and said second photo-electric converting devices.

2. The method of claim 1, wherein said alignment is toe-in angle and/or camber angle.

3. The method of claim 2, wherein, said alignment is at least a toe-in angle, and said first and said second measuring locations are set substantially along a horizontal line through the axis of rotation of said wheel.

4. The method of claim 3, wherein, when said alignment further includes a camber angle, and further comprising:
   (a3) projecting a third pair of light beams, which are in parallel to each other and separated by a predetermined distance, to a third area of said side wall of a tire of said wheel or to a flat surface detachably attached to said wheel;
   (b3) receiving reflected light from said third projected pair of light beams incident on said side wall or said flat surface and forming images from said reflected light at an image-forming surface of a third photo-electric converting device at a third location, said third imaging device being at a fixed distance from said wheel in an approximately axial direction;
   (c3) measuring a length of a third space between said images formed on said third photo-electric converting device;
   (d3) calculating a third distance to a third point on said side wall or said flat surface between the points of incidence of said second pair of light beams on said side wall or said flat surface from said third photo-electric converting device, using said length of said third space; and (f) calculating said camber angle of said wheel from said first, second, and third distances and said first, second, and third locations of said first, second, and third photo-electric converting devices.

5. The method of claim 1, wherein said act (e) is carried out at the same time for every location.

6. An apparatus for measuring a distance to a surface, the apparatus comprising:

projecting means for projecting a pair of light beams in parallel to each other, while keeping a separation therebetween at a constant, toward said surface;

a photo-electric converting device having an image forming surface, said photo-electric converting device being capable of converting one or more images formed on said image forming surface into an electrical signal indicating the locations of said one or more images on said image-forming surface relative to a reference location on said image forming surface;

image forming means for receiving light from said projected pair of light beams reflected from said surface and forming a pair of images on said image forming surface; and processing means for processing said electrical signal produced by said photo-electric converting device responsive to said pair of images formed by said image forming means, and capable of measuring an image separation between said images, and capable of calculating a distance to a portion of said surface between said pair of projected light beams from a predetermined reference point from said image separation.

7. The apparatus of claim 6, wherein said image forming means includes an optical lens whose center defines said predetermined reference point for measurement.

8. The apparatus of claim 7, wherein said lens has a fixed focal length.

9. The apparatus of claim 6, wherein said photo-electric converting device is a CCD sensor having a predetermined number of pixels on its image forming plane.

10. The apparatus of claim 6, wherein said processing means includes a central processing unit for carrying out a calculation according to a predetermined formula to determine a distance to a point of interest on said wheel from said predetermined reference point for measurement.

11. An apparatus for measuring alignment of a wheel of a vehicle, comprising:

a plurality of measurement apparatuses, each of said measuring apparatuses including:

projecting means for projecting a pair of light beams, in parallel to each other while keeping a separation therebetween at constant, toward a side wall of a tire of said wheel or a flat surface detachably attached to said wheel;

a photo-electric converting device having an image forming surface, said photo-electric converting device being capable of converting one or more images formed on said image forming surface into an electrical signal, said signal indicating the locations of said one or more images on said image-forming surface relative to a reference location on said image forming surface;

image forming means for receiving light from said projected pair of light beams reflecting from said side wall or from said flat detector surface, thereby to form a pair of images of said pair of light beams on said image forming surface; and a reference to said reference location on said image forming surface;

wherein each measuring apparatus has been calibrated to produce a set of calibration data, and a structure, for positioning each of said plurality of apparatuses in a reference plane at a plurality of locations, each location being at roughly the same radial distance from the axis of rotation of said wheel, and said beams being projected roughly parallel to said axis of rotation; and processing means for:

processing said electrical signals produced by each of said photo-electric converting devices of each of said plurality of apparatuses calculating each of a plurality of distances to a plurality of portions of said side wall or said surface from said references of said plurality of apparatuses from said electrical signals and said set of calibration data; and calculating at least one alignment angle of said wheel from said plurality of distances so calculated.

12. The apparatus of claim 11, wherein said projecting means comprise a pair of light sources for producing said pair of light beams, which are located on the opposite sides of the associated photo-electric converting device while lying in the same plane.

13. The system of claim 12, wherein at least one measurement apparatus is positioned on a vertical line above the axis of rotation of said wheel and said pair of light sources are located on a horizontal line.

14. The system of claim 13, wherein at least two measurement apparatuses are located on a horizontal line, through the axis of rotation of said wheel, and said light sources of each apparatus are located along a vertical line.

15. The system of claim 14, wherein each of said pair of light sources of said at least two measurement apparatuses are located on top and bottom of the associated photo-electric converting device while lying in the same vertical plane.

16. The system of claim 14, wherein said structure further comprises positioning means for positioning each of said measuring apparatuses in a roughly radial direction relative to said axis of rotation of said wheel to allow measurements to be made on wheels of differing size.

* * * * *